Jan. 18, 1966    S. A. GILBERT ETAL    3,230,016
PROCESS AND APPARATUS FOR PNEUMATIC CONVEYANCE OF SOLIDS
Filed June 1, 1962    3 Sheets-Sheet 1

INVENTORS
HAROLD REINTJES & STANLEY A. GILBERT
BY
Kenneth W. Brown, Atty

Jan. 18, 1966     S. A. GILBERT ETAL     3,230,016
PROCESS AND APPARATUS FOR PNEUMATIC CONVEYANCE OF SOLIDS
Filed June 1, 1962     3 Sheets-Sheet 2

INVENTORS
HAROLD REINTJES & STANLEY A. GILBERT
BY
Kenneth W. Brown, Atty

INVENTORS
HAROLD REINTJES & STANLEY A. GILBERT

3,230,016
PROCESS AND APPARATUS FOR PNEUMATIC CONVEYANCE OF SOLIDS

Stanley A. Gilbert, Fairhaven, and Harold Reintjes, Short Hills, N.J., assignors to Petrocarb, Inc., New York, N.Y., a corporation of Delaware
Filed June 1, 1962, Ser. No. 199,311
5 Claims. (Cl. 302—53)

This invention relates to an improved process and apparatus for effecting pneumatic conveyance of solids and has for its particular object to provide an improved process and apparatus for effecting the pneumatic transport of solids at consistent and controlled rates and high solids to gas ratios.

Accordingly, the invention resides in an improved process for effecting pneumatic conveyance of particulate solid materials comprising introducing a gas into the lower portion of a mass of such material maintained in a container under positive pressure, thereby at least partially fluidizing or "fluffing" the material, flowing said material admixed with said gas downwardly from the container through one or more annular passages into one or more connecting conduits, introducing additional gas into said conduit, or each of said conduits, from behind the point of introduction of said solids-gas mixture thereinto and conducting said solids to ultimate use.

The invention also resides in apparatus especially adapted for effecting pneumatic conveyance of solid materials in accordance with the improved process aforesaid.

The invention further resides in a process for effecting pneumatic conveyance of solid materials substantially as will be described hereinafter.

The invention still further resides in apparatus constructed, arranged and adapted for use substantially as will be described hereinafter with particular reference to the accompanying drawings.

A manner of carrying the invention into effect will now be described with particular reference to the accompanying drawings wherein.

Figure 1:
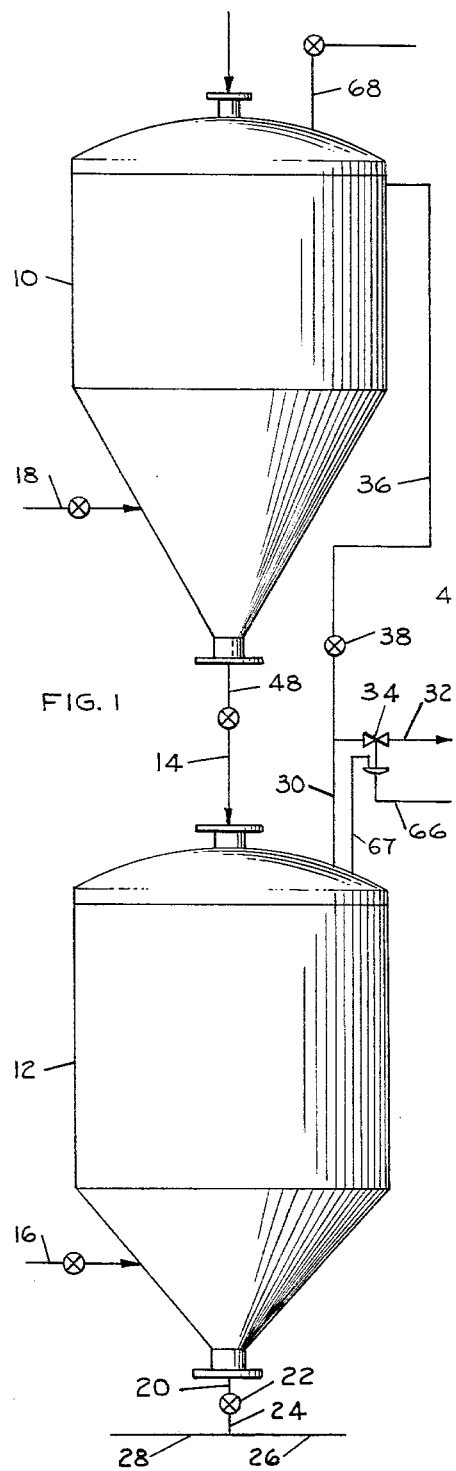
FIGURE 1 is a flow diagram of the process of this invention amplified to show the general external shape and relative positioning of the principal apparatus elements.

In the flow diagram of FIGURE 1, particulate solids of appropriate particle size for easy conveyance and end use are discharged from storage tank 10 into primary injector tank 12 through valved conduit 14. Air or other compatible gas is introduced into the discharge zone of injector tank 12 through pipe 16 and, if desired, into storage tank 10 through pipe 18, in the manner hereinafter described. Discharge conduit 20 leads from the bottom of injector tank 12 through valve 22 into mixing unit 24, shown in detail in FIGURE 5. Air or gas is supplied to arm 26 of the mixing unit and the mixture of air and solids are discharged from arm 28 of the unit.

From the upper zone of injector tank 12 a gas discharge conduit 30 leads to atmospheric discharge conduit 32 through pressure control valve 34 and to storage tank pressure equalization conduit 36 which is provided with a manual valve 38.

One essential feature of our invention resides in the method of discharging the solids from the injector tank 12 for entrainment in the conveying gas. Suitable apparatus therefor is shown in detail in FIGURE 2. It will be noted that the configuration of the bottom of tank 12 is conical and mounted centrally therewithin is double cone 40, the outer surface of the lower inverted cone of double cone 40 being roughly parallel to, and substantially spaced apart from, the wall 41 of the conical bottom of tank 12. The exact spacing between double cone 40 and wall 41 is, of course, subject to considerable variation. However, the width of the annular passageway thus formed between the inverted cone of double cone 40 and wall 41 will generally be of the same order of size as the width of the bottom opening 49 in tank 12. Generally, the width of said annular passageway will vary from about ½ to 2 times the width of said bottom opening. The apex of each of the cones of double cone 40 for best efficiency describes an angle of about 60° although some departure from this angularity in both directions is permissible. In any case the angle of flare of the bottom of tank 12 must be roughly in accord with that of the apex of the inverted cone of double cone 40. It should also be noted that the inverted cone may be truncated as indicated by dotted line 43.

Figure 2:
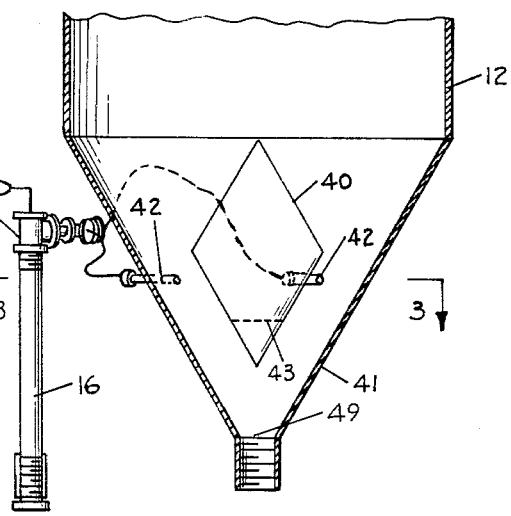
FIGURE 2 is a side view partly in cross section of a discharge zone from the primary injector tank and associated equipment.
Figure 3:
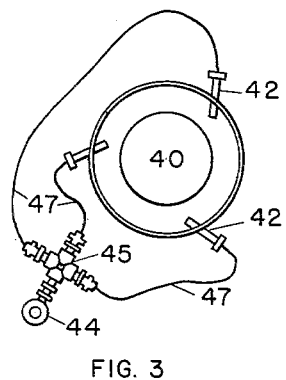
FIGURE 3 is a plan view taken along line 3—3 of FIGURE 2.

Extending through the conical wall 41 of the tank bottom are one or more gas injection nozzles 42 which preferably lie somewhat below the horizontal midsection or widest horizontal section of double cone 40 as shown in FIGURE 2, or at said midsection, but may in some cases be slightly above said midsection. These nozzles 42 are supplied with air or gas from pipe 16, the flow thereto being controlled by a valve such as 44. A suitable deployment of nozzles 42 is shown in the plan view of FIGURE 3 wherein distribution of the gas from valve 44 is handled by means of cross 45 and flexible tubing 47. Other spacing and positioning of the nozzles 42 may be used within the contemplation of this invention. For example, the nozzles 42 may be mounted completely inside the wall 41 of tank 12, such as on the inverted portion of double cone 40.

Figure 4:
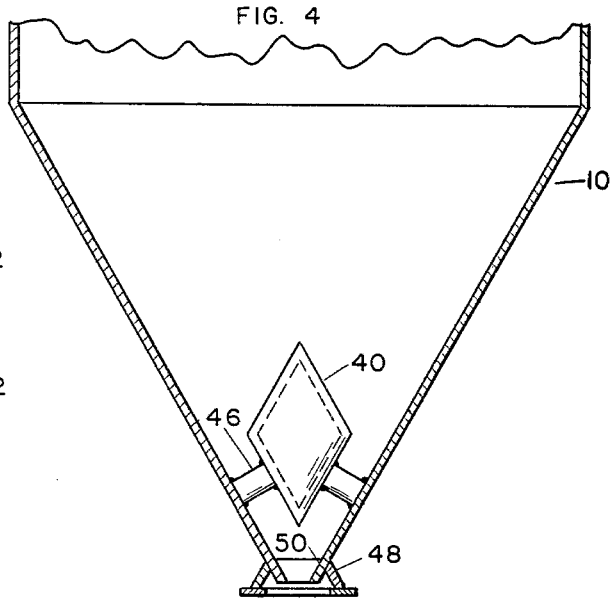
FIGURE 4 is a side view partly in cross section of the discharge zone of the storage tank.

As has been indicated above, storage tank 10 may be constructed similarly to the injector tank 12; however, for simplicity, it is preferred to employ the construction illustrated in FIGURE 4. The double cone 40, attached to the bottom wall by several spider flanges 46 (two shown), as, in fact, the double cone is attached to the bottom section of tank 12, serves the same purpose as in tank 12. However, the gas jets may be omitted since precise uniformity of flow from tank 10 into tank 12 is not important and the double cone alone provides free flow without hang back of material. Nevertheless, flow is improved and likelihod of plugging in initial section 48 of conduit 14 is substantially eliminated by sizing initial secton 48 somewhat larger than the exit orifice of the tank bottom. A sloping ledge 50 is thus provided over which the solid material freely cascades.

Figure 5:
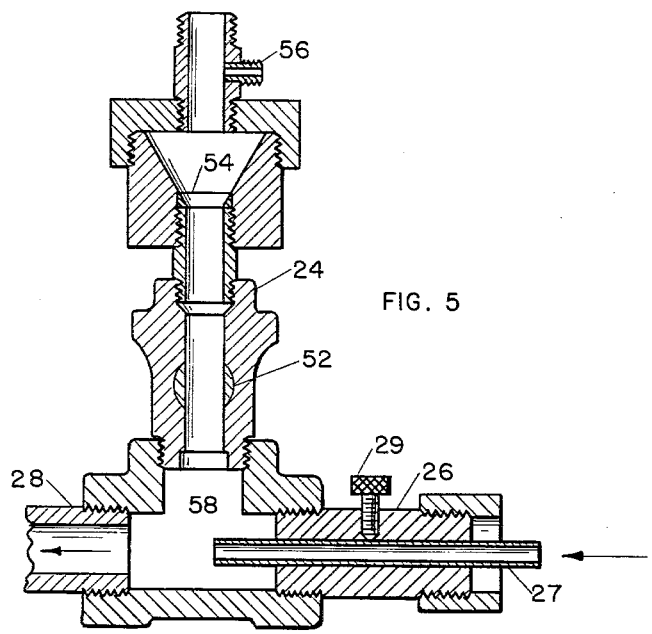
FIGURE 5 is a sectional side view of the gas-solids mixing unit or T.

The mixing unit 24 in which the particulate solid is entrained in the conveying gas is shown in detail in FIGURE 5. This is connected to conduit 20 below valve 22 unless this valve is omitted, which it may be since the mixing unit incorporates a valve 52 in any event. The mixing unit is provided near the upper inlet end with an orifice 54, preferably of frustoconical shape. This shape is important as a means of avoiding plugging which might result from the use of a cylindrical orifice. Just above the orifice 54 there is provided a side inlet tube 56 through which gas can be supplied in proportionately small volume to assist in controlling flow and maintaining free flow of solid material through the orifice 54 and conduit into mixing zone 58. Pipe 26 is the diluter gas inlet branch of the mixing unit, and pipe 28 the outlet for the mixture of gas and solid material. The inlet branch is advantageously equipped with a slidably mounted insert pipe 27 whereby to adjust the size of the gas inlet conduit and its place of discharge with the aid of set screw 29.

Figure 7:
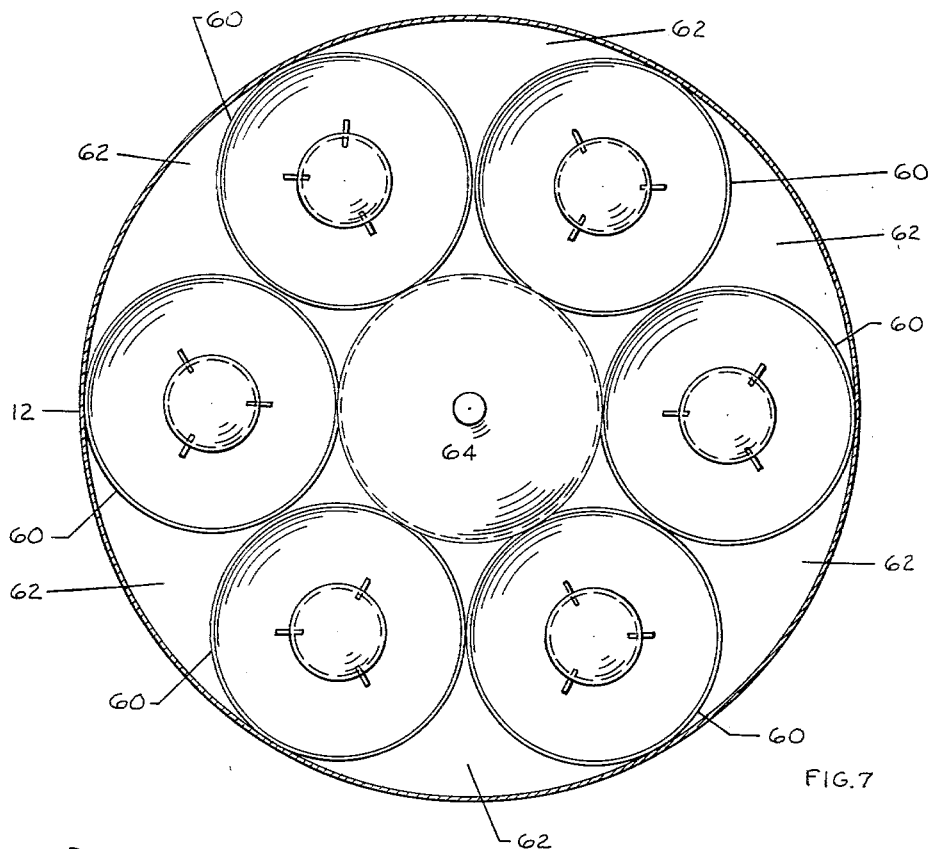
FIGURE 7 is a plan view of the entire multi-hopper injector tank taken on line 7—7 of FIGURE 6.
Figure 6:
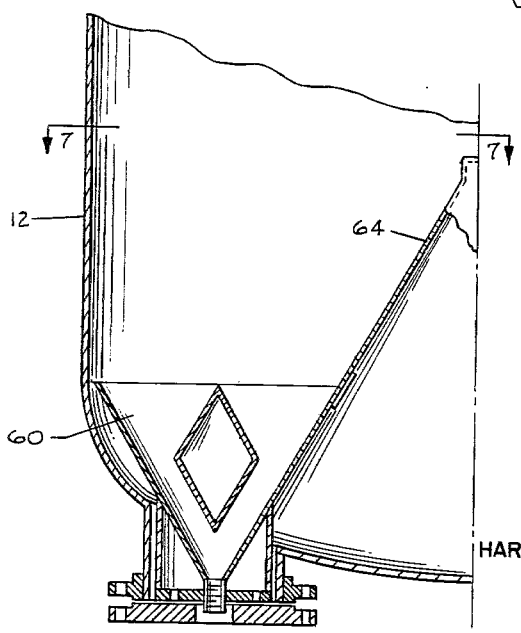
FIGURE 6 is a side view in cross section of a single discharge hopper in a multi-hopper nest of a primary injector tank having a total of 6 discharge hoppers.

Although the process of this invention can be carried out in the single cone injector tank of FIGURE 2, it is often desirable to employ an injector tank having a plurality of conical discharge zones, e.g., in order to provide better control when the material must be delivered simultaneously to several points such as to the tuyeres of a blast furnace. Such multi cone apparatus is illustrated by FIGURES 6 and 7, in which six cones 60 are deployed in a circle around the bottom of a primary injector tank. An inverted cone 64 in the center serves to direct the flow of solid material to the several discharge cones 60. The dead spaces 62 around and between the several cones may either be filled with inert material, such as dry sand, or allowed to fill up with the material being handled.

The process is carried out in apparatus such as that described above in the following manner. Primary injector tank 12 is initially charged with particulate solid material and air or other suitable gas is injected thereinto from line 16 through nozzles 42. The flow of gas is at a constant rate and in sufficient volume to maintain the bed of solids in the lower section of the tank 12 in somewhat open condition but not necessarily in the state of agitation and suspension commonly encountered in fluidized beds. In other words the primary function of the inflowing gas is to lubricate flow of solids out of the tank under the pressure generated by the flow of gas into the tank. For convenience, this condition may be termed, semi-fluidization. Without this particular form of fluidization, flow of most types of solids from a tank, even under pressure, can not be maintained at the precisely controlled, consistent rates required for the functions achieved by this invention.

The solid material flows under pressure from tank 12 into the mixing unit 24 (see FIGURE 5), the size of orifice 54 and the amount of bleed gas admitted through 56 determining, for any given pressure in the tank, the rate of solids flow thereinto. In the mixing unit the particulate solid is picked up by the diluter gas introduced through pipe 26 and is conveyed out through pipe 28 for uses such as those hereinafter described.

It has been discovered that for best results, particularly in the handling of materials having relatively poor flow properties, it is desirable to introduce a greater quantity of gas into tank 12 through pipe 16 than is required to propel the solid material through discharge conduit 20 at the desired rate. The principal reason for this is that the end use demand pressure may fluctuate, often unpredictably and to considerable extent, as in a blast furnace. The most precise control over solids delivery rate from tank 12 is, therefore, achieved by introducing an excess of gas into the tank at constant rate and maintaining the pressure in the tank constant with respect to the pressure at the point of solids discharge, and hence controlling the rate of solids discharge, by venting the excess from the tank through conduits such as 30 and 32. When the end use demand pressure is invariable, vent rate will be constant, and a simple flow adjusting valve can be used in the vent line. But, when demand pressure is variable, an automatic differential pressure response valve is the most desirable for controlling vent flow. By connecting such a valve 34 through pressure lines 66 from the demand zone and 67 from the injector tank, vent flow can constantly be maintained at proper operational levels.

It will be noted that conduit 30 is likewise connected into conduit 36 provided with valve 38. This line is used for equalizing the pressure in tanks 12 and 10 during replenishment of injector tank 12 with solid material from storage tank 10, the valve in conduit 14 being opened for the purpose and the material flowing by gravity from one tank to the other, the pressure therein ordinarily being equal, although under some conditions, e.g., when transferring materials having poor flow properties, the pressure may be higher in tank 10 than in tank 12, in which case valve 38 will be closed.

While it has been pointed out above that semi-fluidization of the solid material in storage tank 10 may be beneficial, ordinarily it is not necessary since the double cone in the center of the hopper-type tank bottom effectively prevents bridging and hangback of the material. In the event that such fluidization might be desirable, gas inlet pipe 18 and valved vent pipe 68 may optionally be provided.

It is well known that reactions between solids and liquids can be facilitated by introducing the solids into the body of liquid beneath the surface thereof. However, when the liquid is very hot and heavy, as in the case of molten iron and steel, it is no easy task to convey the solids thereinto. In the heretofore known methods of transporting solids in gases, the systems have invariably been quite dilute. Furthermore, solids flow rates were variable and uncontrollable, particularly when the solids could not thereby be introduced into zones of superatmospheric pressure. High gas dilution of solids feed is intolerable for injection into molten iron and steel. For that reason transport at precisely uniform rate with a minimum of transport gas is required, and this for the first time has been made possible by the process and apparatus of this invention. Transport of solids at solids-to-gas weight ratios as high as 120:1 may be achieved by the practice of this invention. The limiting factor is slugging or pulsating, which occurs if the system is overloaded. The solids-to-gas weight ratio at which slugging occurs depends on the properties of the material being conveyed, the length and diameter of the transport line, the feed rate of the solids, the direction of flow, the lift involved, i.e., the magnitude of the vertical component of the transport line, and the accuracy of feed rate control desired.

For example, gas-solids mixtures prepared according to this invention may typically be composed as follows for the following conditions. In each case the solid has good flow properties and is 100% minus 20 mesh and the distance of transport is one hundred feet.

| Pipe size, I.D., in. | Slope, deg. | Solids feed rate pounds/minute | Max. ratio solids-gas | Min. gas flow, pound/min. |
|---|---|---|---|---|
| ½ | 0 | 45 | 40:1 | 0.2 |
| ½ | −30 | 45 | 75:1 | 0.2 |
| ½ | +25 | 45 | 25:1 | 0.2 |
| 1 | 0 | 45 | 55:1 | 0.8 |
| 1 | 0 | 200 | 35:1 | 0.8 |

It will be seen from the above data that for a given solids feed rate, the maximum solids/gas ratio increases as the size of the conduit increases but decreases as the average slope of the conduit increases.

While the principal value of this invention when operating at high solids-to-gas ratios is as described, the invention has great value in many pneumatic transport applications requiring a controlled solids feed rate. Not only is the process unique in its ability to control solids flow rates precisely, but also it is applicable at solids flow rates as low as one pound a minute into a gas stream of any quantity. In such cases the solids-to-gas weight ratio is determined by process requirements rather than energy requirements for the transport system.

The amount of gas flowing through the material in the tank 12 and into the discharge pipe 20 relative to that entering at the mixing unit will depend on the material being conveyed and the tank pressure. Using comparatively large, uniform sized material, the flow of conveying gas through the tank will be appreciable at high tank pressures and may approach 100% of the total conveying gas. At low tank pressure, and with a finely divided material, there may be little flow of gas through the material in the tank 12. Regardless of the amount of gas flowing through the tank, a satisfactory conveyance of a given material is possible by proper selection of the tank pressure, solids to gas ratio, size of the conduits in the mixing unit and size of the pipe line required to move the desired amount of material.

It can readily be seen that the flow and pressure relationships utilized in the operation of the apparatus of this invention are unexpected, even by one skilled in the art of pneumatic conveying. Generally, the higher the pressure inside the primary injector, the higher the flow rate of solids—everything else being equal. However, the volume of diluter gas (gas entering mixing unit through pipe 26) flowing results in an inverse relationship with the amount of solids injected at any given and constant tank pressure. This combination of direct proportionality with tank pressure and inverse proportionality with diluter gas flow permits the novel control of the solids flow rate. An illustration of these relationships is given in the following table for injecting both anthracite coal and lime through a ½" diameter hose into an atmospheric pressure receiving vessel. The particle size of the anthracite and lime were both comparable, namely, minus 10 mesh, 98% plus 100 mesh material.

|  | Anthracite coal | | | | Lime | | | |
|---|---|---|---|---|---|---|---|---|
| Tank pressure, p.s.i.g | 15 | 15 | 10 | 10 | 30 | 30 | 10 | 10 |
| Tank flow, s.c.f.m | 3 | 3 | 2 | 2 | 4 | 5 | 1 | 1 |
| Diluter flow, s.c.f.m | 3 | 2 | 8 | 3 | 6.7 | 2.75 | 6 | 3.75 |
| Total flow, s.c.f.m | 6 | 5 | 10 | 5 | 10.7 | 7.75 | 7 | 4.75 |
| Solids rate, lbs./min | 14 | 16 | 5 | 11 | 20 | 25 | 10 | 11 |

The preferred range of particle sizes of the material to be conveyed is ⅛" on the top side and 15% or less of minus 100 mesh, with a relatively uniform weight percentage on each of the intermediate screens, in other words, a normal aggregate distribution such as is obtained when breaking coal. Under certain conditions, however, an aggregate up to ½" in size can be handled. On the bottom side, it is possible to convey certain aggregates containing as much as approximately 70% by weight of minus 200 mesh particles, provided a valve such as 34 is employed to maintain proper pressure in the injector tank. However, if present in significant amounts, i.e., 25% or more, such fines should not be so small or of such a nature that they agglomerate. Since the velocities are low in the normal practice of this invention, size degradation of the particles is minimized in contrast to the attrition of particles normally occurring in regular pneumatic conveying systems.

The process of this invention is particularly useful for the injection of crushed minus 8 mesh size, partially dry coal into the tuyeres of a blast furnace. It appears possible thereby to replace up to at least 30% and even up to 50% of the weight of coke normally used in the charge to the blast furnace, which will greatly improve the economics of iron production. The process of this invention is also useful for charging coke ovens in order to minimize nuisance and reduce labor costs. The large scale injection of iron ore and lime into the oxygen roof lances of open hearth steel furnaces also offers substantial savings in their cost of operation.

A typical application of the process and apparatus of this invention is as follows:

Two primary injector tanks each having a live storage capacity of 2.5 tons of prepared coal, are each located approximately 25 feet from a blast furnace. Each of the two primary injector tanks is equipped with four conical outlets, each having the needed associated equipment including a mixing unit. Each mixing unit is connected to a one-half inch inside diameter line which, in turn, is connected to an alloy steel lance mounted so as to feed into a blast furnace tuyere. The primary injector tanks are each filled automatically, on demand signal, from a pressurized storage vessel located above same. The pressure in each injection tank is controlled at approximately twenty pounds above the pressure in the tuyeres, which is approximately fifteen pounds gauge pressure during blast. A typical rate of coal injection is approximately twenty pounds per minute in each of the eight tuyeres at a solids to air weight ratio of 20:1. However, when feeding highly coking coal, a solids to air ratio of about 10:1 will ordinarily be used in order to avoid coking in the lances due to the high temperature, in which case the size of the transport lines can be adjusted to provide approximately the same solids feed rate at the same tank pressure.

In the above described installation, valves and pressure regulators are remotely and automatically controlled. Since the length of the one-half inch (½") transport tubing is different for each run to the tuyeres (because of the great distance around the blast furnace), the control orifices in the mixing units are of slightly different sizes to compensate for the different pressure drop in each line. This difference in size is minimized because of the additional control provided by the introduction of a small amount of bleed gas through inlets 56 in the mixing assemblies of FIGURE 5.

Another example of the use of the process of this invention is the injection of iron ore and lime into an oxygen roof lance of an open hearth furnace. In this case a storage injector tank feeds a primary injector tank with solids at a typical rate of 500 lbs. per minute at a solids to gas weight ratio of approximately 11:1. The primary injector tank is automatically kept at a constant level, and re-injects the solids into a roof lance at the same 500 lbs. per minute feed rate. However, the solids to gas ratio from the primary injection tank is higher, on the order of 65:1, with the excess transport air being automatically vented. Typical operating pressures in the two injector tanks are 70 p.s.i.g. in the storage injector tank and 32 p.s.i.g. in the primary injector tank.

In still another open hearth application, lime and ore are each fed at precise and controllable feed rates of approximately 1000 and 1300 lbs. per minute respectively from batch injectors at solids to gas weight ratios of 52:1 and 65:1 respectively in which cases the primary injectors are located such that the solids are conveyed approximately 150' total distance including a 65' vertical lift, with a 3" diameter conveying line.

The gas used as a carrier for the solids will, of course, be one which is compatible with the various reactants involved. Thus, the gas may be one which is desired to be reacted with the molten mixture such as oxygen for the injection of ore, lime, etc., into an open hearth furnace or gas such as nitrogen for injection of carbon into molten metal baths, or a non-reactive gas such as argon for injecting mixtures of magnesium and lime into a bath of iron or steel, or a gas such as air for injection of coal into a coke oven.

It will be appreciated that, when handling solids with very good flow characteristics, the process of this invention can be carried out by the use of a single inner cone only in inverted position in the discharge section of the injector tank 12. However, the use of the double cone is greatly to be preferred since a higher degree of precision in flow control is thereby achieved. Furthermore, with the double cones, solids having higher moisture contents and/or unusually large amounts of fines (minus 100 mesh) can be tolerated and the inherent angle of repose of the material is much less critical.

Having described our invention together with preferred embodiments thereof, what we claim and desire to secure by U.S. Letters Patent is:

1. Apparatus for effecting pneumatic conveyance of particulate solid materials comprising:
   (a) a container, the lower part of which comprises at least one inverted conical section having mounted centrally therewithin a double cone baffle composed of two considerably smaller cones joined base to base and arranged so that the walls of the lower cone of said double cone baffle are substantially parallel to the walls of said inverted conical section,
   (b) a solids charging inlet near the top of said container,
   (c) means for laterally introducing and distributing a gas into the annular space between said lower cone and said inverted conical section,
   (d) a mixing chamber under said container with a substantially vertical passageway connecting the bottom of the inverted conical section of said container with the top of said mixing chamber,
   (e) a downwardly converging tapered orifice having a downside discharge opening substantially smaller than the cross-sectioin of said vertical passageway between the bottom of the inverted conical section of said container and said mixing chamber,
   (f) means for supplying gas under pressure to said means described in (c) and to one side of said mixing chamber, and
   (g) means to conduct material pneumatically out of the opposite side of said mixing chamber.

2. Apparatus for effecting pneumatic conveyance of particulate solid materials comprising:
   (a) a container, the lower part of which comprises at least one inverted conical section having mounted centrally therewithin a double cone baffle composed of two considerably smaller cones joined base to base and arranged so that the walls of the lower cone of said double cone baffle are substantially parallel to the walls of said inverted conical section,
   (b) solids charging inlet near the top of said container, said inlet being provided with means for withholding internal pressure,
   (c) means for introducing and distributing a gas into the annular space between said lower cone and said inverted conical section, said means being substantially above the apex of said inverted conical section,
   (d) a mixing chamber under said container with a passageway connecting the bottom of the inverted conical section of said container with the top of said mixing chamber,
   (e) means for supplying gas under pressure to said distributing means referred to in (c) and to one side of the said mixing chamber, and
   (f) means to conduct material pneumatically out of the opposite side of said mixing chamber.

3. The apparatus of claim 2 in which a downwardly converging tapered orifice, having a downside discharge opening substantially smaller than the cross-section of said passageway, is interposed in said passageway between the bottom of the inverted conical section of said container and said mixing chamber.

4. The apparatus of claim 2 in which, in step (d), said passageway contains solids flow restricting means substantially circular in cross-section.

5. The apparatus of claim 4 in which the solids flow restricting means is a circular orifice smaller in diameter than the diameter of said connecting passageway.

References Cited by the Examiner

UNITED STATES PATENTS

| | | | |
|---|---|---|---|
| 2,115,023 | 4/1938 | Kennedy | 302—53 |
| 2,400,194 | 5/1946 | Day | 302—53 |
| 2,568,379 | 9/1951 | Berg | 302—53 |
| 2,794,686 | 6/1957 | Anselmen | 302—53 |
| 3,007,744 | 11/1961 | Ward | 302—53 |

SAMUEL F. COLEMAN, *Primary Examiner.*

ANDRES H. NIELSEN, ERNEST A. FALLER,
*Examiners.*